(12) United States Patent
Iwata et al.

(10) Patent No.: US 8,659,789 B2
(45) Date of Patent: Feb. 25, 2014

(54) PRINTER

(71) Applicants: Masaji Iwata, Tokorozawa (JP); Masanori Akaoka, Shinjuku-ku (JP)

(72) Inventors: Masaji Iwata, Tokorozawa (JP); Masanori Akaoka, Shinjuku-ku (JP)

(73) Assignees: Citizen Holdings Co., Ltd, Tokyo (JP); Citizen Systems Japan Co., Ltd, Tokyo (JP)

( * ) Notice: Subject to any disclaimer, the term of this patent is extended or adjusted under 35 U.S.C. 154(b) by 0 days.

(21) Appl. No.: 13/768,663

(22) Filed: Feb. 15, 2013

(65) Prior Publication Data
US 2013/0242316 A1 Sep. 19, 2013

(30) Foreign Application Priority Data

Mar. 13, 2012 (JP) ................................. 2012-056520

(51) Int. Cl.
*G06K 15/00* (2006.01)

(52) U.S. Cl.
USPC ............................................ 358/1.5; 358/1.1

(58) Field of Classification Search
USPC .................................................. 358/1.5, 1.1
See application file for complete search history.

(56) References Cited

FOREIGN PATENT DOCUMENTS

| JP | 2001-301255 | | 10/2001 | |
|----|-------------|---|---------|---|
| JP | 2001301255 | * | 10/2001 | ............... B41J 11/70 |
| JP | 2002067413 | * | 5/2002 | ............... B41J 11/70 |
| JP | 3624372 | | 3/2005 | |
| JP | 3840992 | | 11/2006 | |

OTHER PUBLICATIONS

JP2002067413 english translation.*
JP2001301255 english translation.*

* cited by examiner

*Primary Examiner* — King Poon
*Assistant Examiner* — Iriana Cruz
(74) *Attorney, Agent, or Firm* — Myers Wolin, LLC

(57) ABSTRACT

When a period from the point of time of receipt of instruction information concerning a cutting instruction to the point of time of receipt of instruction information concerning a printing instruction subsequent to the receipt of the instruction information concerning the cutting instruction has reached a prescribed period, a recording medium is cut and conveyed in a reverse direction by a prescribed distance, and then new printing is started. When the period from the point of time of receipt of the instruction information concerning the cutting instruction to the point of time of receipt of the instruction information concerning the printing instruction subsequent to the receipt of the instruction information concerning the cutting instruction has not reached the prescribed period, the recording medium is cut and then new printing is started without convey of the recording medium in the reverse direction.

6 Claims, 3 Drawing Sheets

PRINTER

CROSS-REFERENCE TO RELATED APPLICATIONS

This application claims priority under 35 U.S.C. §119 to JP Application No. 2012-056520 filed Mar. 13, 2012, the contents of which are incorporated by reference herein.

BACKGROUND OF THE INVENTION

1. Field of the Invention

The present invention relates to a printer that performs printing on a long recording medium and that cuts at a prescribed position, the recording medium having undergone printing.

2. Description of the Related Art

One conventional printer prints on a long recording medium, based on received instruction information from an external device and cuts the recording medium printed with given information, at a position that is further downstream in a conveyance direction of the recording medium than a print position of printing on the recording medium. Such a printer cuts the recording medium in a state where conveyance of the recording medium is suspended.

With such a printer, when printing is suspended in response to suspension of the conveyance of the recording medium, a difference in print quality may arise before and after a position of suspension of printing or a minute shift between adjacent dots may arise, leading to a deterioration of print quality. For this reason, single character data, continuous image data, etc. are usually printed continuously without suspending printing in the midst of a printing cycle.

For example, a printer used at a retail store, etc. for primarily printing out receipts may print preliminarily specified data, such as a store logo, on the header of a recording medium (portion near the end cut at the previous printing). When the size of the specified data in the conveyance direction of the recording medium is larger than the size of a space between a print position and the cutting position in the conveyance direction and if the next printing is started right after the end of the previous printing during continuous printing based on command information, suspension of the conveyance of the recording medium to cut the recording medium carrying information printed at the previous printing suspends the subsequent printing in the midst of the printing cycle. Consequently, the quality of the subsequent printing deteriorates as described above.

On the other hand, if the subsequent printing is started from a point at which the recording medium subjected to the previous printing has been conveyed to the cutting position, a unnecessary blank is created on the recording medium. The blank has a size equivalent to the size of the space between the print position and the cutting position, resulting in accelerated consumption of the recording medium. By reducing the size of the specified data in the conveyance direction of the recording medium to a size smaller than the size of the space between the print position and the cutting position in the conveyance direction, the consumption of the recording medium consequent to an unnecessary blank can be suppressed without deteriorating print quality. In such a case, however, the size of the specified data is limited, or, conversely, the size of the printer is increased in adjustment to the size of the specified data.

According to a conventional technique for solving these problems, for example, a printer prints specified data on the head of the next printing. The specified data has a size, in a conveyance direction of the recording medium, larger than the size of a space between a print position and a cutting position in the conveyance direction. The printer operates in such a way that the printer prints the specified data on the head of the next printing ensuing the previous printing, conveys the recording medium in a direction reverse to the print direction, cuts the recording medium at the boundary position between the previous printing and the next printing, and then conveys the recording medium forward by a distance equal to a distance by which the recording medium has been conveyed in the reverse direction, to print data subsequent to the already printed specified data (see, e.g., Japanese Patent No. 3624372).

Another conventional technique is known, according to which, for example, when not receiving instruction information concerning the next printing before the elapse of a prescribed period from the end of the previous printing, a printer conveys the recording medium until the part carrying printed information passes a cutting position, cuts the recording medium, and then conveys an unprinted part of the recording medium to a print position in the reverse direction, and when receiving instruction information concerning the next printing instruction before the elapse of the prescribed period, successively performs the next printing following the previous printing and cuts the recording medium when the previous printing reaches the cutting position (see, e.g., Japanese Patent Laid-Open Publication No. 2001-301255).

Still another technique is known, according to which, for example, a printer that prints specified data on the head of the next printing operates in such a way that the printer cuts the recording medium following the end of the previous printing, receives instruction information concerning the next printing instruction, and then conveys the recording medium in a reverse direction at a point of time before the start of printing according to the instruction information (see, e.g., Japanese Patent No. 3840992).

However, according to the conventional technique described in Japanese Patent No. 3624372, because the specified data for the next printing is printed continuously after the recording medium passes the cutting position following the end of the previous printing, when the size of the specified data in the conveyance direction of the recording medium is larger than the size of the space between the print position and the cutting position in the conveyance direction, the recording medium is passed through the cutting position and ejected out of the printer because of the end of the previous printing of the specified data is conveyed in the reverse direction at the completion of printing of the specified data until a cutting location of the recording medium matches the cutting position of the printer.

The conventional technique described in Japanese Patent No. 3624372 thus has a problem in that when an operator, etc. misjudges the completion of printing and carelessly pulls the recording medium out of the printer in the midst of the printing process, trouble may occur, which includes a shift of the actual cutting position from the original cutting position (cutting location) and printing in a disordered form.

According to the conventional technique described in Japanese Patent Laid-Open Publication No. 2001-301255, when instruction information concerning the next printing instruction is received before the elapse of prescribed period from the end of the previous printing, the next printing is executed successively following the previous printing and the recording medium is cut when the previous printing reaches the cutting position. This means that the recording medium is cut in the middle of the next printing, which poses a problem in that securing print quality is difficult when continuous printing is performed.

According to the conventional technique described in Japanese Patent No. 3840992, after the receipt of instruction information concerning the next printing instruction, the recording medium is conveyed in the reverse direction at a point of time before the start of printing according to the instruction information. In the case of a printer that partially cuts the recording medium leaving a part thereof left uncut, for example, if the timing at which the instruction information concerning the next printing instruction is received is improper, the next recording medium is conveyed in the reverse direction although the recording medium subjected to the previous printing has not been removed yet, causing a problem in that the previously produced printed item may bend in an undesirable manner, damaging the appearance thereof.

SUMMARY OF THE INVENTION

It is an object of the present invention to at least solve the above problems in the conventional technologies.

According to one aspect of the present invention, a printer includes a receiving unit that receives from an external device, instruction information including at least a printing instruction or a cutting instruction concerning a long recording medium; a conveying unit that conveys the recording medium in a forward direction from an upstream-side to a downstream-side and in a reverse direction from the downstream-side to the upstream-side along a conveyance path of the recording medium, based on instruction information received by the receiving unit; a printing unit that based on instruction information concerning a printing instruction received by the receiving unit, prints information based on the instruction information, onto the recording medium conveyed in the forward direction by the conveying unit; a cutting unit that cuts the recording medium at a prescribed position further downstream than a print position for printing by the printing unit, based on instruction information concerning a cutting instruction received by the receiving unit; a control unit that controls the conveying unit, printing unit, and the cutting unit; and a time counting unit that counts time from a point of time at which the receiving unit receives instruction information concerning a cutting instruction to a point of time at which the receiving unit receives instruction information concerning a printing instruction subsequent to receipt of the instruction information concerning the cutting instruction. The control unit, when the time counted by the time counting unit has reached a prescribed period, causes the cutting unit to cut the recording medium, causes the conveying unit to convey the recording medium in a reverse direction by a prescribed distance, and then causes the printing unit to start new printing. The control unit, when the time counted by the time counting unit has not reached the prescribed period, causes the cutting unit to cut the recording medium and then causes the printing unit to start new printing without causing the conveying unit to convey the recording medium in the reverse direction.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Preferred embodiments of a printer according to the present invention will be described in detail with reference to the accompanying drawings.

Figure 1:
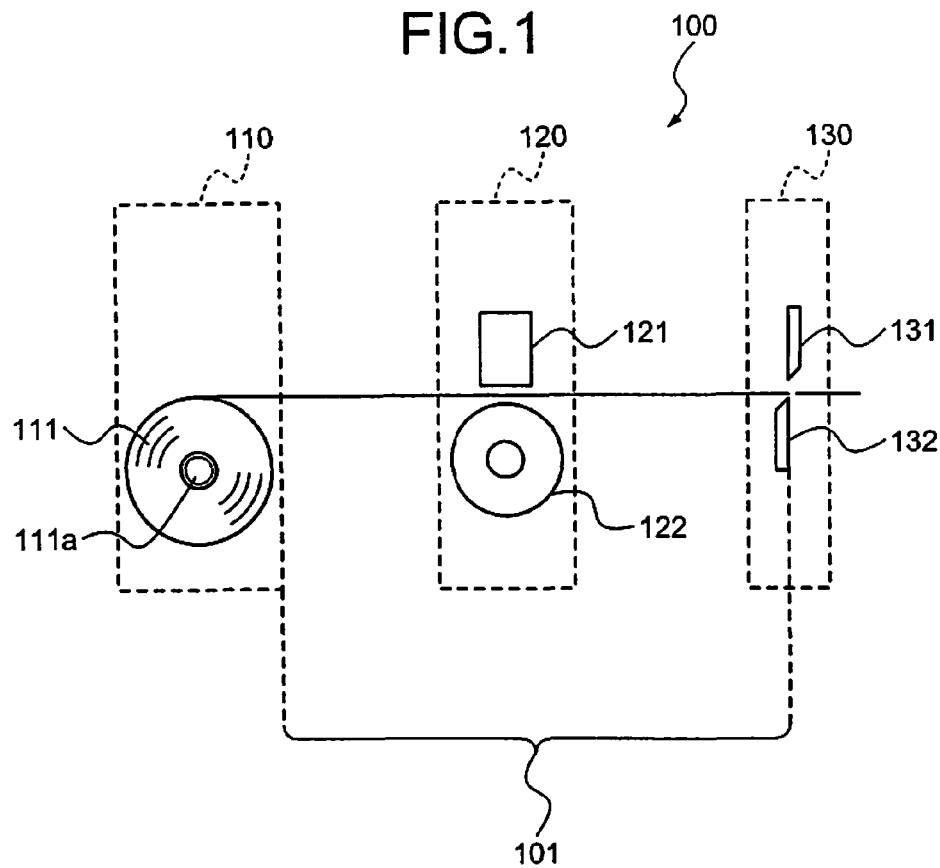
FIG. 1 is an explanatory diagram of a configuration of the printer according to the embodiment of the present invention.

A schematic configuration of a printer according to an embodiment of the present invention will be described. FIG. 1 is an explanatory diagram of a configuration of the printer according to the embodiment of the present invention. In FIG. 1, a printer 100 includes a rolled paper holding unit 110, a printing mechanism 120, and a cutter mechanism 130. The printer 100 further includes a conveyance path 101 from the rolled paper holding unit 110 through the printing mechanism 120 and to the cutter mechanism 130.

The rolled paper holding unit 110 holds a long recording medium (rolled paper) 111. The rolled paper holding unit 110 holds a core 111a serving as the center about which the recording medium 111 is wound along the longitudinal direction. The core 111a is held in a rotatable state allowing an outer peripheral end of the recording medium 111 to be pulled out of the rolled paper holding unit 110 and into the conveyance path 101. FIG. 1 depicts a cross sectional view orthogonally bisecting the length of the core 111a of the recording medium 111.

The printing mechanism 120 prints characters, etc. on the recording medium 111 conveyed from the rolled paper holding unit 110. The printing mechanism 120 prints not only characters but also objects, such as symbols, given logos, and images. Printing by the printing mechanism 120 is, for example, by a thermal method.

The printing mechanism 120 that performs printing by the thermal method has a thermal print head (thermal head) 121. For example, the thermal print head (thermal head) 121 has multiple heating elements (thermistors) aligned linearly along the width of the recording medium 111 and a driver IC that drives the thermistors.

In the thermal print head (thermal head) 121, each heating element is disposed on a wafer, which is not depicted. This wafer is fabricated by, for example, layering an alumina substrate with a glaze layer, a barrier layer, a thermistor layer, electrode wires, an oxidation-resistant/abrasion-resistant layer, etc. (which are not depicted).

The driver IC causes a power source, which is not depicted, to selectively energize an electrode wire corresponding to each heating element of the thermal print head (thermal head) 121 and thereby, causes the heating element corresponding to the energized electrode wire to generate heat. The thermal print head (thermal head) 121 transmits the heat generated by the heating element to the recording medium 111 having a thermal color developing property and thereby, prints characters, symbols, various images, etc. on the thermal color developing surface of the recording medium 111.

The printer 100 of this embodiment equipped with the printing mechanism 120 that performs thermal printing uses the recording medium 111 having a thermal color developing property. The thermal print head (thermal head) 121 and a control method for the thermal print head (thermal head) 121 can be realized by employing various known techniques, and are therefore omitted in further description.

The printing mechanism 120 may perform printing by an impact method. The printing mechanism 120 that performs printing by the impact method has an impact printing head and a mechanism holding an ink ribbon interposed between the print head and the recording medium 111 (which are not depicted). The printing mechanism 120 that performs printing by the impact method may have a driving source, such as a motor, that gives the print head a driving force to cause the print head to move back and forth in a scanning direction (along the width of the recording medium 111).

The impact print head has multiple bundled wire pins and has a structure in which the front ends of the multiple wire pins are arranged into a matrix form. The wire pins are each capable of independently projecting toward the recording medium 111. The impact print head selectively strikes the wire pins against the recording medium 111 through the ink ribbon to imprint tiny spots (dots) on the recording medium 111 and thereby, prints characters, etc. The impact print head can be realized by employing known techniques, and is therefore omitted in further description.

The print mechanism 120 has a platen 122 set opposite to the print head (thermal head) 121 across the conveyance path 101. The platen 122 supports the recording medium 111, which is subjected to a print pressure by the print head (thermal head) 121 during printing, from the opposite side of the print head (thermal head) 121 across the conveyance path 101.

In this embodiment, the platen 122 has a function of conveying the recording medium 111. For example, the platen 122 has a shaft extending in a direction substantially parallel with the length of the core 111a of the rolled recording medium 111 held by the rolled paper holding unit 110, and rotates around the shaft.

The platen 122 is connected to a driving source, such as a platen motor (see reference numeral 205 in FIG. 2), via a gear, etc., which is not depicted. The platen 122 is rotated by a driving force transmitted from the platen motor to the platen 122, and rotates as the recording medium 111 is held between the platen 122 and the print head (thermal head) 121 and thereby, realizes a function of conveying the recording medium 111.

The platen 122 rotates in a direction corresponding to the direction of rotation of the platen motor. The direction of rotation of the platen 122 can be changed by changing the direction of rotation of the platen motor. For example, corresponding to the direction of rotation of the platen motor, the platen 122 can rotate in a direction (hereinafter "forward direction") in which along the conveyance path 101, the recording medium 111 is conveyed from a side closer to the rolled paper holding unit 110 with respect to the print mechanism 120 (hereinafter, "upstream-side") toward a side closer to the cutter mechanism 130 with respect to the print mechanism 120 (hereinafter, "downstream-side") and also in a direction (hereinafter "reverse direction") in which the recording medium 111 is conveyed from the downstream-side toward the upstream-side.

The structure of the platen 122 is not limited to a rotatable structure. For example, when the print mechanism 120 performs printing by the impact method, the platen 122 may have a structure such that the platen 122 is at a fixed position and does not rotate to support the recording medium 111 under a print pressure, from the opposite side of the print head (thermal head) 121.

When the platen 122 of a non-rotatable structure is used, one or multiple rollers are provided, which apply a conveyance force to the recording medium 111 in the conveyance path 101. In this case, the roller that applies the conveyance force to the recording medium 111 in the conveyance path 101 is connected to a driving source, such as a conveyance motor, via a gear, etc. In this case, the roller is configured so that the direction of rotation of the roller can be changed to a direction of conveying the recording medium 111 in the forward direction and in the reverse direction, by changing the direction of rotation of the conveyance motor connected to the roller.

The cutter mechanism 130 is disposed on the downstream-side of the printing mechanism 120 in the conveyance direction of the recording medium 111 along the conveyance path 101. The cutter mechanism 130 has a fixed blade 131 whose position is fixed and a movable blade 132 disposed at a position opposite to the fixed blade 131 across the conveyance path 101. The movable blade 132 is movable in a direction to come in contact with and move away from the fixed blade 131. The movable blade 132 is maintained at a position away from the fixed blade 131 when in a non-operating state, such as a stand-by state, in preparation for cutting the recording medium 111.

The cutter mechanism 130 has a driving source, such as a movable blade motor (see reference numeral 206 in FIG. 2), and a power transmitting mechanism (not depicted) that transmits a driving force generated by the motor to the movable blade 132. When the recording medium 111 is positioned between the fixed blade 131 and the movable blade 132, the cutter mechanism 130 reciprocates the movable blade 132 by a driving force generated by the movable blade motor in such a way that the movable blade 132 approaches the fixed blade 131, comes in contact with the fixed blade 131, and then moves away from the fixed blade 131 to remain at a position separated from the fixed blade 131.

The cutter mechanism 130 reciprocates the movable blade 132 so that part of the movable blade 132 does not come in contact with part of the fixed blade 131 and thereby, performs so-called partial cutting of the recording medium 111, leaving a part of the recording medium 111 uncut. As a result of partial cutting, the recording medium 111 is not cut into separated pieces but remains connected to the rolled recording medium 111 held by the printer 100 and thereby, prevents cut pieces of the recording medium from scattering around the printer 100.

Partial cutting is performed, for example, in such a way that the recording medium 111 is cut leaving a portion of one end, along the width, uncut. Partial cutting may be performed in such a way that the recording medium 111 is cut leaving a central portion along the width left uncut. The cutting mechanism 130 may completely cut the recording medium 111 by reciprocating the movable blade 132 so that the entire movable blade 132 comes in contact with the entire fixed blade 131.

Figure 2:
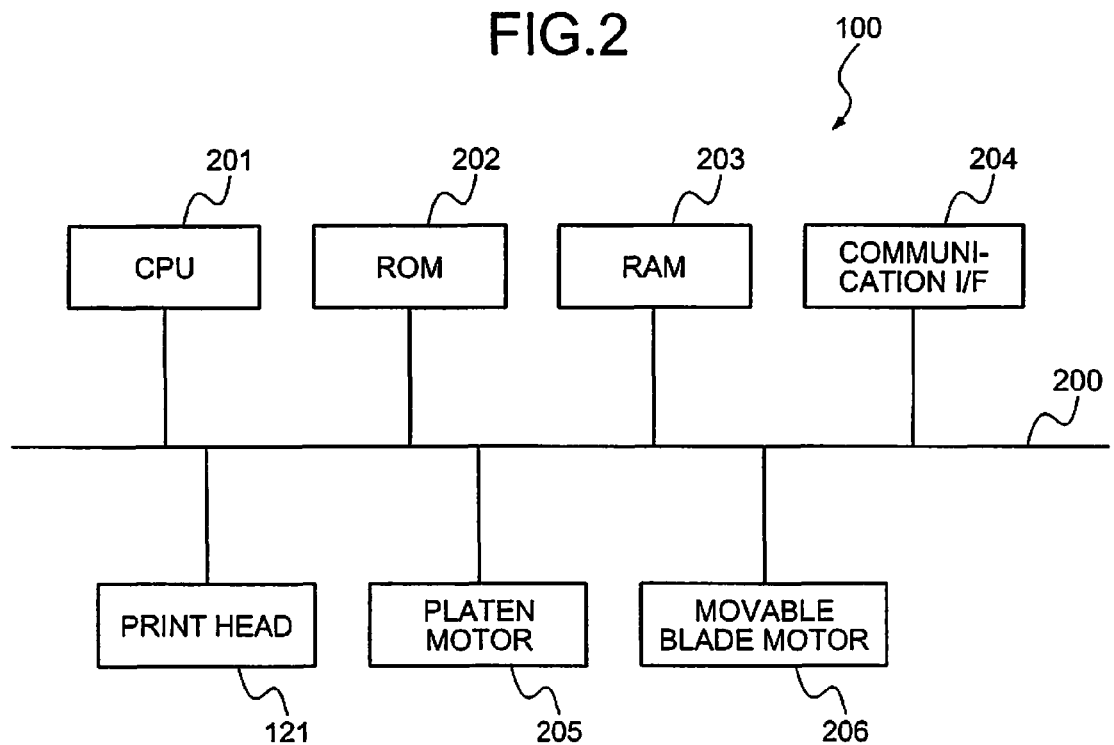
FIG. 2 is an explanatory diagram of a hardware configuration of the printer 100 of the embodiment according to the present invention.

A hardware configuration of the printer 100 of the embodiment according to the present invention will be described. FIG. 2 is an explanatory diagram of a hardware configuration of the printer 100 of the embodiment according to the present invention. In FIG. 2, the printer 100 according to the embodiment of the present invention includes a CPU 201, a ROM 202, a RAM 203, a communication interface (I/F) 204, the print head (thermal head) 121, the platen motor 205, and the movable blade motor 206.

The CPU 201 governs overall control of the printer 100. The ROM 202 stores programs including a boot program. The ROM 203 is used as a work area of the CPU 201. The RAM 203 is used, for example, when the CPU 201 expands image data for printing based on print data.

The communication interface (I/F) 204 is connected to an external device, which is not depicted. The communication interface (I/F) 204 administers an interface of the printer 100 with a network, and controls data input/output by a computer. The external device generates various types of instruction information for the printer 100, and outputs the generated instruction information to the printer 100. The external device is realized as, for example, a cash register, a point-of-sales (POS) terminal, etc. installed at retail stores, such as a supermarket and convenience store.

The print head (thermal head) 121 is driven and controlled by the CPU 201, and selectively energizes the electrode wires respectively corresponding to the heating elements via the driver IC and thereby, selectively causes each heating element to generate heat. The print head (thermal head) 121 transmits the heat generated by the heating element to the recording medium 111 having a thermal color developing property and thereby, prints characters, symbols, various images, etc. on the thermal color developing surface of the recording medium 111.

The platen motor 205 and the movable blade motor 206 convert electrical energy into mechanical energy to generate a rotation driving force. The platen motor 205 is realized as, for example, a stepping motor, etc. The movable blade motor 206 is realized as, for example, a DC motor.

The platen motor 205 and the movable blade motor 206 are each controlled by the CPU 201, and change directions of rotation according to an excitation sequence and the direction of applied current. By controlling the excitation sequence and the direction of current applied to the platen motor 205 and movable blade motor 206 by the CPU 201, the direction of rotation of the platen motor 205 and that of the movable motor 206 can be changed arbitrarily.

Figure 3:
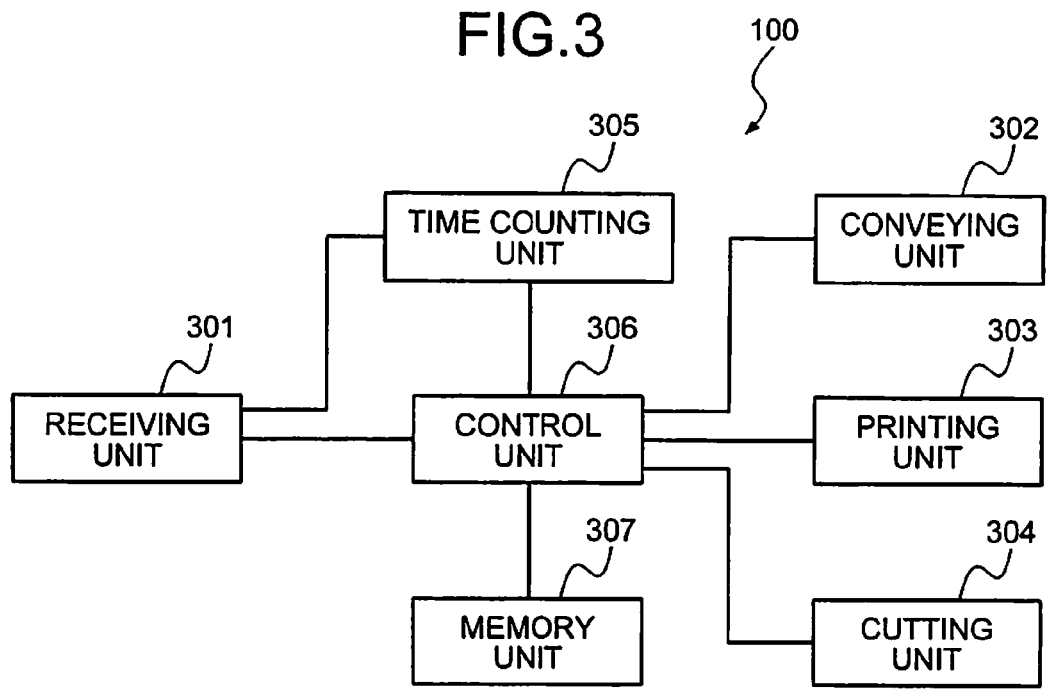
FIG. 3 is a block diagram of a functional configuration of the printer 100 of the embodiment according to the present invention.

A functional configuration of the printer 100 of the embodiment according to the present invention will be described. FIG. 3 is a block diagram of a functional configuration of the printer 100 of the embodiment according to the present invention. The printer 100 includes a receiving unit 301, a conveying unit 302, a printing unit 303, a cutting unit 304, a time counting unit 305, a control unit 306, and a memory unit 307.

The functions of the printer 100 can be realized by the receiving unit 301, the conveying unit 302, the printing unit 303, the cutting unit 304, the time counting unit 305, the control unit 306, and the memory unit 307, which can be realized by the respective hardware components of the printer 100.

The receiving unit 301 receives instruction information output from the external device to the printer 100. The receiving unit 301 receives instruction information including at least a printing instruction or a cutting instruction concerning the long recording medium 111. The printing instruction included in the instruction information instructs to perform printing based on print data output from the external device (first printing) or printing based on print data stored in advance to the printer 100 (second printing).

The conveying unit 302 conveys the recording medium 111 in the forward direction and in the reverse direction, based on instruction information received by the receiving unit 301. The conveying unit 302 is controlled by the control unit 306, and when receiving a control signal output from the control unit 306 to the conveying unit 302 based on instruction information received by the receiving unit 301, conveys the recording medium 111 in the forward direction or the reverse direction according to the control signal.

Based on instruction information concerning a printing instruction received by the receiving unit 301, the printing unit 303 prints information based on the instruction information, onto the recording medium 111 conveyed in the forward direction by the conveying unit 302. The printing unit 303 is controlled by the control unit 306, and when receiving a control signal output from the control unit 306 to the printing unit 303 based on instruction information received by the receiving unit 301, energizes the heating elements of the thermal head according to the control signal.

The cutting unit 304 cuts the recording medium 111 at a prescribed position (cutting position) further downstream than a print position for printing by the printing unit 303, based on instruction information concerning a cutting instruction received by the receiving unit 301. The cutting unit 304 is controlled by the control unit 306, and when receiving a control signal output from the control unit 306 to the cutting unit 304 based on instruction information received by the receiving unit 301, drives and controls the movable blade motor 206 according to the control signal.

The time counting unit 306 counts time from the point of time at which the receiving unit 301 receives instruction information concerning a cutting instruction to the point of time at which the receiving unit 301 receives instruction information concerning a printing instruction subsequent to the receipt of the instruction information concerning the cutting instruction. In the embodiment, the time counting unit 306 counts, for example, the time from the point of time at which the receiving unit 301 receives instruction information concerning a cutting instruction to the point of time at which the receiving unit 301 receives instruction information concerning a first printing instruction subsequent to the receipt of the instruction information concerning the cutting instruction.

The control unit 306 controls the conveying unit 302, the printing unit 303, and the cutting unit 304. For example, when the receiving unit 301 receives instruction information concerning a printing instruction, the control unit 306 controls the conveying unit 302 to cause the conveying unit 302 to convey the recording medium 111 along with the printing operation of the printing unit 303 based on the instruction information concerning the printing instruction.

When the receiving unit 301 receives instruction information concerning a printing instruction, the control unit 306 expands image data on the ROM 203, etc., based on the instruction information concerning the printing instruction, calculates an energizing period for making the dots forming the expanded image data, and controls the printing unit 303 to cause the printing unit 303 to energize the heating elements of the thermal head according to the calculated energizing period.

For example, when receiving instruction information concerning a first printing instruction, the control unit 306 controls the conveying unit 302 and the printing unit 303 based on the instruction information concerning the first printing instruction and thereby, prints on the recording medium 111, image data based on arbitrary print data output from the external device. For example, when receiving instruction information concerning a second printing instruction, the control unit 306 controls the conveying unit 302 and the printing unit 303 based on the instruction information concerning the second printing instruction and thereby, prints on the recording medium 111, print data stored in advance in the memory unit 307 (hereinafter, "specified data").

The memory unit 307 stores the above specified data. The memory unit 307 stores one or specified data. When storing multiple specified data, the memory unit 307 correlates each specified data with identification information assigned to each specified data. As a result, when multiple specified data are stored, a desired specified data can be identified. In addition to the specified data, the memory unit 307 may store information used for controlling current supply to the heating elements (thermistors), such as information used for calculating coloring concentration and information concerning a history of energization of the heating elements (thermistors).

When the receiving unit 301 receives instruction information concerning a printing instruction, for example, the control unit 306 controls the conveying unit 302 to cause the conveying unit 302 to convey the recording medium 111 in the forward direction until a cutting location on the recording medium 111 reaches a cutting position for cutting by the cutter mechanism 130.

When the receiving unit 301 receives instruction information concerning a printing instruction subsequent to the receipt of instruction information concerning a cutting instruction, for example, the control unit 306 determines whether the time counted by the time counting unit 305 has reached a prescribed period at a point of receipt of the instruction information, based on the time counted by the time counting unit 305. For example, the control unit 306 determines if a period from the point of time at which the receiving unit 301 receives the instruction information concerning the cutting instruction to the point of time at which the receiving unit 301 receives the instruction information concerning the printing instruction subsequent to the receipt of the instruction information concerning the cutting instruction is greater than or equal to 1 second.

The prescribed period used as a criterion for the determination may be set arbitrarily based on, for example, the communication rate of communication between the external device and the printer 100. For example, the prescribed period used as the criterion for the determination is not limited to 1 second, but may be set to "0.5 seconds", which is shorter than 1 second, or to "2 seconds", which is longer than 1 second.

In other words, the control unit 306 determines whether the period from the point of time at which the receiving unit 301 receives instruction information concerning a cutting instruction to the point of time at which the receiving unit 301 receives instruction information concerning a printing instruction subsequent to the receipt of the instruction information concerning the cutting instruction has reached the prescribed period. For example, the control unit 306 of the embodiment determines whether the period from the point of time at which the receiving unit 301 receives instruction information concerning a cutting instruction to the point of time at which the receiving unit 301 receives instruction information concerning a first printing instruction subsequent to the receipt of the instruction information concerning the cutting instruction has reached the prescribed period.

When the time counted by the time counting unit 305 has reached the prescribed period, the control unit 306 controls the cutting unit 304 to cause the cutting unit 304 to cut the recording medium 111, controls the conveying unit 302 to cause the conveying unit 302 to convey the recording medium 111 in the reverse direction by a prescribed distance, and then starts new printing based on instruction information concerning a printing instruction that the receiving unit 301 receives subsequent to the receipt of instruction information concerning a cutting instruction.

For example, the control unit 306 controls the conveying unit 302 to cause the conveying unit 302 to convey the recording medium 111 in the reverse direction by the distance substantially equal to the distance between a print position and a cutting position in the conveyance direction of the recording medium 111. The control unit 306, for example, controls the conveying unit 302 to cause the conveying unit 302 to convey the recording medium 111 in the reverse direction by a distance slightly shorter than the distance between the print position and the cutting position in the conveyance direction of the recording medium 111.

If the time counted by the time counting unit 305 has not reached the prescribed period, the control unit 306 controls the cutting unit 304 to cause the cutting unit 304 to cut the recording medium 111 and then controls the conveying unit 302 and the printing unit 303 to start new printing based on instruction information concerning a printing instruction that the receiving unit 301 receives subsequent to the receipt of instruction information concerning a cutting instruction. In other words, if the time counted by the time counting unit 305 has not reached the prescribed period, the control unit 306 controls the conveying unit 302 and the printing unit 303 to start new printing without causing the conveying unit 302 to convey the recording medium 111 in the reverse direction.

The control unit 306 holds instruction information concerning a second printing instruction that has been received during a period from the point of time at which the receiving unit 301 receives instruction information concerning a cutting instruction to the point of time at which the receiving unit 301 receives instruction information concerning a first printing instruction subsequent to the receipt of the instruction information concerning the cutting instruction. When the period from the point of time at which the receiving unit 301 receives the instruction information concerning the cutting instruction to the point of time at which the receiving unit 301 receives the instruction information concerning the first printing instruction subsequent to the receipt of the instruction information concerning the cutting instruction has reached the prescribed period, the control unit 306 controls the cutting unit 304 to cause the cutting unit 304 to cut the recording medium 111, controls the conveying unit 302 to cause the conveying unit 302 to convey the recording medium 111 in the reverse direction by the prescribed distance, controls the conveying unit 302 and the printing unit 303 to perform printing based on the held instruction information concerning the second printing instruction, and then starts new printing based on the instruction information concerning the first printing instruction after the end of the printing based on the held instruction information concerning the second printing instruction.

Figure 4:
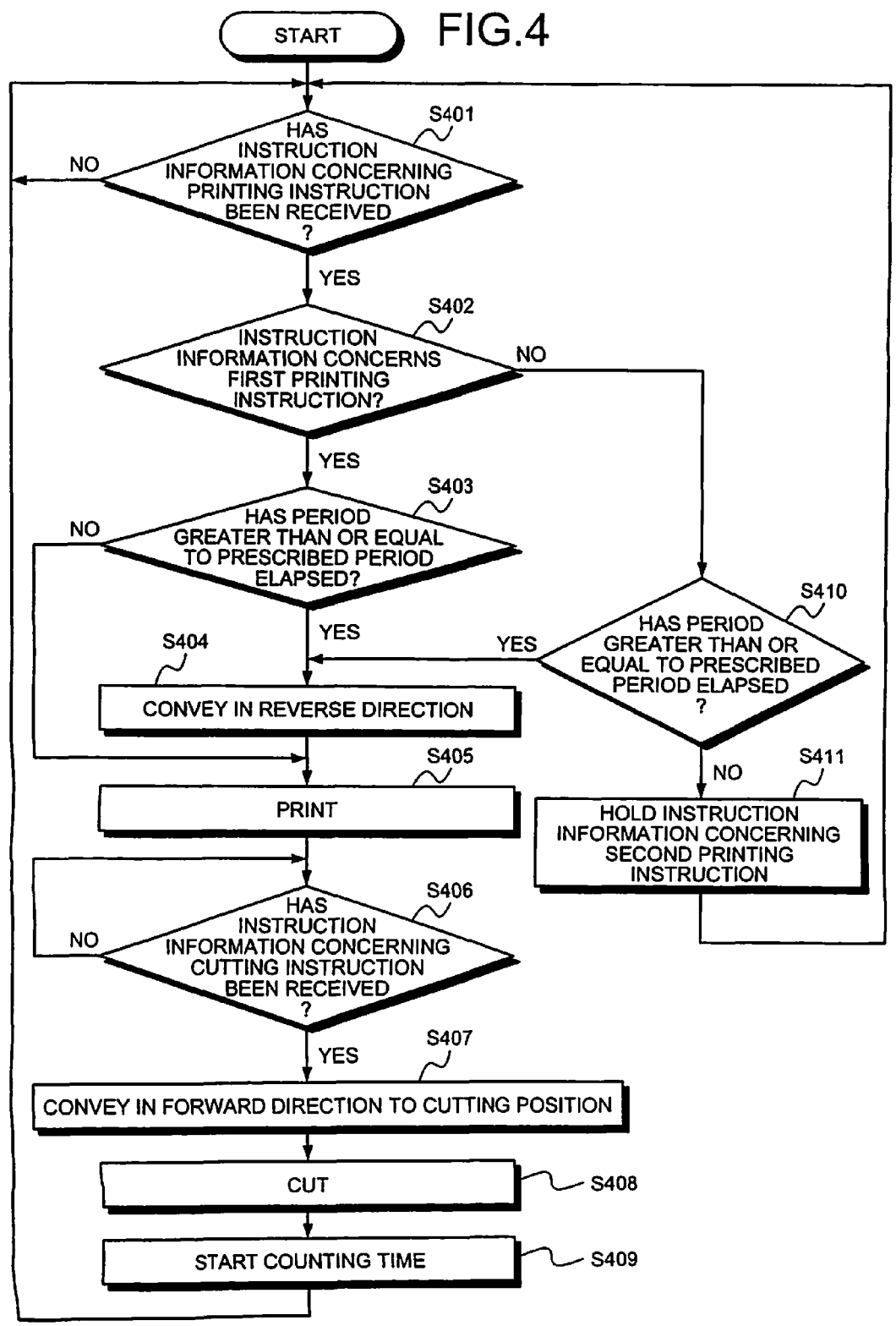
FIG. 4 is a flowchart of the procedure by the printer 100 of the embodiment according to the present invention.

A procedure by the printer 100 of the embodiment according to the present invention will be described. FIG. 4 is a flowchart of the procedure by the printer 100 of the embodiment according to the present invention. In the flowchart of FIG. 4, the printer 100 stands by until receiving instruction information concerning a printing instruction output from the external device (step S401: NO), and when receiving the instruction information concerning the printing instruction (step S401: YES), determines whether the instruction information is instruction information concerning a first printing instruction (step S402).

At step S402, when the instruction information concerning the printing instruction received at step S401: YES is instruction information concerning a first printing instruction (step S402: YES), the printer 100 determines if a period from the point of time of receipt of the previous instruction information concerning a cutting instruction to the point of time of receipt of the instruction information concerning the first printing instruction at step S401: YES subsequent to the receipt of the instruction information concerning the cutting instruction is greater than or equal to the prescribed period (step S403). Step S403 in FIG. 4 indicates "HAS PERIOD GREATER THAN OR EQUAL TO PRESCRIBED PERIOD ELAPSED?".

At step S403, if the period from the point of time of receipt of the instruction information concerning the previous cutting instruction to the point of time of receipt of the instruction information concerning the first printing instruction at step S401: YES subsequent to the receipt of the instruction information concerning the cutting instruction is greater than or equal to the prescribed period (step S403: YES), the printer 100 drives and controls the platen motor 205 to convey the recording medium 111 in the reverse direction by the prescribed distance (step S404), and proceeds to step S405.

At step S403, if the period from the point of time of receipt of the instruction information concerning the previous cutting instruction to the point of time of receipt of the instruction information concerning the first printing instruction at step S401: YES subsequent to the receipt of the instruction information concerning the cutting instruction is shorter than the prescribed period (step S403: NO), the printer 100 proceeds to step S405 without conveying the recording medium 111 in the reverse direction.

At step S405, the printer performs printing based on instruction information concerning a printing instruction that is received before the point of time at which the instruction information concerning the first printing instruction is received at step S401: YES after the recording medium 111 is cut by driving and controlling the movable blade motor 206 at the previous printing (step S405). At step S405, when receiving instruction information concerning a second printing instruction before the point of time at which the instruction information concerning the first printing instruction is received at step S401: YES after the recording medium 111 is cut by driving and controlling the movable blade motor 206 at the previous printing, the printer 100 performs printing based on the instruction information concerning the second printing instruction and then performs printing based on the instruction information concerning the first printing instruction received at step S401: YES.

The printer 100 stands by until receiving instruction information concerning a cutting instruction output from the external device (step S406: NO), and when receiving the instruction information concerning the cutting instruction (step S406: YES), conveys the recording medium 111 in the forward direction until a cutting location on the recording medium 111 printed with information at step S405 matches a cutting position (step S407). Step S407 in FIG. 4 indicates "CONVEY RECORDING MEDIUM IN FORWARD DIRECTION TO CUTTING POSITION".

After conveying the recording medium 111 in the forward direction to the cutting position at step S407, the printer 100 drives and controls the movable blade motor 206 to cut the recording medium 111 (step S408), and starts counting time from the point of receipt of the instruction information concerning the cutting instruction at step 406: YES (step S409).

When the next instruction information concerning a first printing instruction is received, the time at which time counting is started at step S409 is used for determining if a period from the point of the time at which time counting is started from the point of time at which the instruction information is received is greater than or equal to the prescribed period. This means that at step S403, the printer determines if the period for which counting is started from the point of receipt of the previous instruction information concerning a cutting instruction is greater than or equal to the prescribed period. The printer 100 then returns to step S401, and stands by until receiving instruction information concerning a printing instruction that is output from the external device following the instruction information concerning the cutting instruction received at step S406: YES.

At step S402, if the instruction information concerning the printing instruction received at step S401: YES is not the instruction information concerning the first printing instruction (step S402: NO), the printer 100 determines the instruction information concerning the printing instruction received at step S401: YES to be instruction information concerning a second printing instruction, and determines if a period from the point of time of receipt of the previous instruction information concerning a cutting instruction to the point of time of receipt of the instruction information concerning the second printing instruction at step S401: YES subsequent to the receipt of the instruction information concerning the cutting instruction is greater than or equal to the prescribed period (step S410). Step S410 in FIG. 4 indicates "HAS PERIOD GREATER THAN OR EQUAL TO PRESCRIBED PERIOD ELAPSED?".

At step S410, if the period from the point of time of receipt of the previous instruction information concerning a cutting instruction to the point of time of receipt of the instruction information concerning the second printing instruction at step S401: YES subsequent to the receipt of the instruction information concerning the cutting instruction is shorter than the prescribed period (step S410: NO), the printer holds the instruction information concerning the second printing instruction (step S411), and proceeds to step S401.

At steps S410, if the period from the point of time of receipt of the previous instruction information concerning a cutting instruction to the point of time of receipt of the instruction information concerning the second printing instruction at step S401: YES subsequent to the receipt of the instruction information concerning the cutting instruction is greater than or equal to the prescribed period (step S410: YES), the printer proceeds to step S404, at which the platen motor 205 is driven and controlled to convey the recording medium 111 in the reverse direction by the prescribed distance.

As described, when a period from the point of time of receipt of instruction information concerning a cutting instruction to the point of time of receipt of instruction information concerning a printing instruction subsequent to the receipt of the instruction information concerning the cutting instruction has reached the prescribed period, the printer 100 of the embodiment cuts the recording medium 111, conveys the recording medium 111 in the reverse direction by the prescribed distance, and then starts new printing. When the period from the point of time of receipt of instruction information concerning a cutting instruction to the point of time of receipt of instruction information concerning a printing instruction subsequent to the receipt of the instruction information concerning the cutting instruction has not reached the prescribed period, the printer 100 cuts the recording medium 111, and then starts new printing without conveying the recording medium 111 in the reverse direction.

In this manner, when receiving instruction information concerning a printing instruction after a period greater than or equal to the prescribed period has elapsed from the point of time of receipt of instruction information concerning a cutting instruction for cutting the recording medium 111, the printer 100 of the embodiment of the present invention cuts the recording medium 111, conveys the recording medium 111 in the reverse direction by the prescribed distance before the start of printing based on the instruction information, and then starts printing based on the instruction information. The printer 100, therefore, can complete printing based on the instruction information without interruption. Hence, the printer 100 of the embodiment of the present invention suppresses the generation of an unnecessary blank on the recording medium, regardless of the distance between the print position and the cutting position in the conveyance direction of the recording medium 111, while securing print quality and thus, can use the recording medium 111 effectively.

The printer 100 of the embodiment of the present invention can arbitrarily set the size of specified data to be printed on the head of the recording medium (portion near a cut-position-side end at the previous printing) irrespective of the distance between the print position and the cutting position in the conveyance direction of the recording medium 111. As a result, the printer 100 of the embodiment of the present invention can establish some degree of freedom in designing a logo, etc. regardless of the distance between the print position and the cutting position in the conveyance direction of the recording medium 111, and can reduce the size the printer 100.

When receiving instruction information concerning a printing instruction before the prescribed period has elapsed from the point of time of receipt of instruction information concerning a cutting instruction for cutting the recording medium 111, the printer 100 of the embodiment of the present invention determines the instruction information concerning the printing instruction to be in series with instruction information received right before the instruction information, and starts printing based on the instruction information without conveying the recording medium 111 in the reverse direction before the start of printing based on the instruction information.

As a result, when printing out multiple printed items sequentially based on a series of instruction information, the printer 100 of the embodiment of the present invention suppresses the occurrence of a case where printed item printed out first is bent in an undesirable manner by adjustment of the print start position of printed item to be printed out later, and allows a series of print operations to be completed more quickly, compared to a case where the print start position of a printed item to be printed out later is adjusted in the same manner as the print start position of a printed item to be printed out first is and thereby, quickly prints out multiple printed items.

For example, when executing a series of print operations based on a series of printing instructions to print out receipts issued in settlement transactions at retail stores, etc. and coupon tickets, warranties, sales certificates, etc. accompanying receipts to be delivered to customers at settlement transactions, the printer 100 can print out multiple printed items issued in the same settlement transaction in a shorter time, compared to a case where the position of the start of recording is adjusted for each printing instruction.

The printer 100 of the embodiment of the present invention conveys the recording medium 111 only in the forward direction from the start of printing to the completion of printing. By checking to see if conveyance of the recording medium 111 has stopped, therefore, whether printing has been completed can be determined. This prevents the occurrence of troubles such as when the recording medium 111 in the middle of the printing process is carelessly pulled out of the printer 100 because of a misjudgment on the completion of printing, an actual cutting position is shift from the original cutting position (cutting location) or printing is made in a disordered form.

The printer 100 of the embodiment of the present invention suppresses generation of an unnecessary blank, regardless of the distance between a print position and a cutting position in the conveyance direction of the recording medium, while securing print quality, and can properly give priority to suppression of generation of a blank and quick completion of printing, depending on the situation.

The printer 100 of the embodiment of the present invention is characterized in that when a period from the point of time of receipt of instruction information concerning a cutting instruction to the point of time of receipt of instruction information concerning a printing instruction subsequent to the receipt of the instruction information concerning the cutting instruction has reached the prescribed period, the printer 100 cuts the recording medium 111, conveys the recording medium 111 in the reverse direction by the prescribed distance, and then starts new printing based on instruction information concerning a first printing instruction.

In this manner, when receiving instruction information concerning a first printing instruction for printing received print data from the external device onto the recording medium 111 after a period greater than or equal to the prescribed period has elapsed from the point of time of receipt of instruction information concerning a cutting instruction, the printer 100 of the embodiment of the present invention cuts the recording medium 111, conveys the recording medium 111 in the reverse direction by the prescribed distance before the start of printing based on the instruction information, and then starts printing based on the instruction information.

When receiving instruction information concerning a second printing instruction for printing print data preliminarily stored to the printer 100, onto the recording medium 111 before a period greater than or equal to the prescribed period has elapsed from the point of time of receipt of instruction information concerning a cutting instruction, the printer 100 of the embodiment of the present invention does not perform printing based on the instruction information concerning the second printing instruction. In other words, when receiving instruction information concerning a printing instruction for, for example, printing a logo, etc. on the head of the recording medium at the next printing, as instruction information concerning a second printing instruction, the printer 100 of the embodiment of the present invention does not perform printing based on the instruction information concerning the second printing instruction until receiving instruction information concerning a first printing instruction.

For example, when the size of a logo, etc., in the conveyance direction, the logo, etc., being printed based on instruction information concerning a second printing instruction, is longer than the distance between a print position and a cutting position, if printing is performed at the point of time of receipt of the instruction information, the front end of the recording medium 111 extends beyond the cutting position on the printer 100, and the extending front end may be bent or broken causing a concern for damage.

According to the printer 100 of the embodiment of the present invention, even when the size of a logo, etc., in the conveyance direction, the logo, etc., being printed based on instruction information concerning a second printing instruction, is longer than the distance between a print position and a cutting position, the front end of the recording medium 111 does not extend beyond the cutting position on the printer 100, which prevents damage to the recording medium 111. As a result, the degree of freedom in designing a logo, etc., can be secured, regardless of the distance between the print position and the cutting position in the conveyance direction of the recording medium 111, and the printer 100 can be reduced in size.

The printer 100 of the embodiment of the present invention can convey the recording medium 111 only in the forward direction from the start of printing to the completion of printing and print out printed items. This prevents the occurrence of troubles such as printing being suspended when the recording medium 111 in the middle of the printing process is carelessly pulled out of the printer 100 because of a misjudgment on the completion of printing.

The printer 100 of the embodiment of the present invention is characterized in that the printer 100 holds instruction information concerning a second printing instruction that has been received during a period from the point of time of receipt of instruction information concerning a cutting instruction to the point of time of receipt of instruction information concerning a first printing instruction subsequent to the receipt of the instruction information concerning the cutting instruction, and is characterized in that when the period from the point of time of receipt of the instruction information concerning the cutting instruction to the point of time of receipt of the instruction information concerning the first printing instruction subsequent to the receipt of the instruction information concerning the cutting instruction has reached the prescribed period, cuts the recording medium 111, conveys the recording medium 111 in the reverse direction by the prescribed distance, performs printing based on the held instruction information concerning the second printing instruction, and then starts new printing based on the instruction information concerning the first printing instruction.

In this manner, when holding instruction information concerning a second printing instruction that has been received during a period from the point of time of receipt of instruction information concerning a cutting instruction to the point of an elapse of a period greater than or equal to the prescribed period and receiving instruction information concerning a first printing instruction after the elapse of a period greater than or equal to the prescribed period from the point of cutting of the recording medium 111, the printer 100 of the embodiment of the present invention conveys the recording medium 111 in the reverse direction by the prescribed distance before execution of printing based on the instruction information, performs printing based on the held instruction information concerning the second printing instruction first, and then starts new printing based on the instruction information concerning the first printing instruction.

As a result, according to the printer 100 of the embodiment of the present invention, when the overall size of multiple logos, etc. printed on the head of the recording medium in the conveyance direction is longer than the distance between a print position and a cutting position, the front end of the recording medium 111 does not stick out of the cutting position on the printer 100, so that damage to the recording medium 111 can be prevented. This ensures a degree of freedom in designing a logo, etc., regardless of the distance between the print position and the cutting position, and miniaturizes the printer 100.

The printer 100 of the embodiment of the present invention is characterized in that the printer 100 conveys the recording medium 111 in the reverse direction by a distance substantially equal to the distance between a print position and a cutting position. In this manner, the printer 100 of the embodiment of the present invention conveys the recording medium 111 in a direction reverse to the conveyance direction of the recording medium 111 by a distance equal to the distance between the print position and the cutting position before the start of printing based on instruction information concerning a printing instruction, and then starts new printing based on the instruction information concerning the printing instruction.

As a result, according to the printer 100 of the embodiment of the present invention, printing can be started from a position close to the cutting position on the recording medium 111, regardless of the distance between the print position and the cutting position in the conveyance direction of the recording medium 111. This assuredly suppresses generation of a blank portion printed with no information at the head of the recording medium 111 and thus, enables effective use of the recording medium 111 without any waste.

As described, the printer of the present invention is useful as a printer that performs printing on a long recording medium and that cuts at a prescribed position, the recording medium having undergone the printing process and is particularly useful as a printer that prints specified data on the head, the specified data having a size longer than the distance between a print position and a cutting position in the conveyance direction of a recording medium.

The printer according to the present invention offers an effect that print quality is secured while controlling the generation of an unnecessary blank area regardless of the distance between the print position and the cutting position in the conveyance direction and enables priority to be properly given to controlling the generation of a blank area and quick completion of printing, as needed.

What is claimed is:

1. A printer comprising:
    a receiving unit that receives from an external device, instruction information including at least a printing instruction or a cutting instruction concerning a long recording medium;
    a conveying unit that conveys the recording medium in a forward direction from an upstream-side to a downstream-side and in a reverse direction from the downstream-side to the upstream-side along a conveyance path of the recording medium, based on instruction information received by the receiving unit;
    a printing unit that based on instruction information concerning a printing instruction received by the receiving unit, prints onto the recording medium conveyed in the forward direction by the conveying unit, information that is based on the instruction information;
    a cutting unit that cuts the recording medium at a prescribed position further downstream than a print position for printing by the printing unit, based on instruction information concerning a cutting instruction received by the receiving unit;
    a control unit that controls the conveying unit, printing unit, and the cutting unit; and
    a time counting unit that counts time from a point of time at which the receiving unit receives instruction information concerning a cutting instruction to a point of time at which the receiving unit receives instruction information concerning a printing instruction subsequent to receipt of the instruction information concerning the cutting instruction, wherein
    the control unit, if the time counted by the time counting unit is at least a prescribed period, causes the cutting unit to cut the recording medium, causes the conveying unit to convey the recording medium in a reverse direction by a prescribed distance, and then causes the printing unit to start new printing, and
    the control unit, if the time counted by the time counting unit is less than the prescribed period, causes the cutting unit to cut the recording medium and then causes the printing unit to start new printing without causing the conveying unit to convey the recording medium in the reverse direction.

2. The printer according to claim 1, wherein
    the receiving unit receives instruction information concerning at least any one among a first printing instruction for printing on the recording medium, print data received by the receiving unit, a second printing instruction for printing on the recording medium, print data preliminarily stored to the printer, and a cutting instruction concerning the recording medium, the time counting unit counts the time from the point of time at which the receiving unit receives instruction information concerning the cutting instruction to the point of time at which the receiving unit receives instruction information concerning the first printing instruction subsequent to the receipt of the instruction information concerning the cutting instruction, and the control unit, if the time counted by the time counting unit is at least the prescribed period, causes the cutting unit to cut the recording medium, causes the conveying unit to convey the recording medium in the reverse direction by the prescribed distance, and then causes the printing unit to start new printing based on the instruction information concerning the first printing instruction.

3. The printer according to claim 2, wherein the control unit holds instruction information concerning the second printing instruction that is received during a period from the point of time at which the receiving unit receives instruction information concerning the cutting instruction to the point of time at which the receiving unit receives the instruction information concerning the first printing instruction subsequent to the receipt of the instruction information concerning the cutting instruction, and the control unit, if the time counted by the time counting unit is at least the prescribed period, causes the cutting unit to cut the recording medium, causes the conveying unit to convey the recording medium in the reverse direction by the prescribed distance, performs printing based on the held instruction information concerning the second printing instruction, and then causes the printing unit to start new printing based on the instruction information concerning the first printing instruction.

4. The printer according to claim 1, wherein the conveying unit conveys the recording medium in the reverse direction by a distance substantially equal to a distance between a print position of printing by the printing unit and a cutting position of cutting by the cutting unit in a conveyance direction of the recording medium.

5. A printer comprising:

a receiving unit that receives from an external device, instruction information including at least a printing instruction or a cutting instruction concerning a long recording medium;

a conveying unit that conveys the recording medium in a forward direction from an upstream-side to a downstream-side and in a reverse direction from the downstream-side to the upstream-side along a conveyance path of the recording medium, based on instruction information received by the receiving unit;

a printing unit that based on instruction information concerning a printing instruction received by the receiving unit, prints onto the recording medium conveyed in the forward direction by the conveying unit, information that is based on the instruction information;

a cutting unit that cuts the recording medium at a prescribed position further downstream than a print position for printing by the printing unit, based on instruction information concerning a cutting instruction received by the receiving unit;

a control unit that controls the conveying unit, printing unit, and the cutting unit; and a time counting unit that counts time from a point of time at which the receiving unit receives instruction information concerning a cutting instruction to a point of time at which the receiving unit receives instruction information concerning a printing instruction subsequent to receipt of the instruction information concerning the cutting instruction, wherein the instruction information concerns at least any one among a first printing instruction for printing on the recording medium, print data received by the receiving unit, a second printing instruction for printing on the recording medium, print data preliminarily stored to the printer, and a cutting instruction concerning the recording medium, the time counting unit counts the time from the point of time at which the receiving unit receives instruction information concerning the cutting instruction to the point of time at which the receiving unit receives instruction information concerning the first printing instruction subsequent to the receipt of the instruction information concerning the cutting instruction, the control unit, if the time counted by the time counting unit is at least a prescribed period, causes the cutting unit to cut the recording medium, causes the conveying unit to convey the recording medium in a reverse direction by a prescribed distance, and then causes the printing unit to start new printing based on the instruction information concerning the first printing instruction, the conveying unit conveys the recording medium in the reverse direction by a distance substantially equal to a distance between a print position of printing by the printing unit and a cutting position of cutting by the cutting unit in a conveyance direction of the recording medium, and the control unit, if the time counted by the time counting unit is less than the prescribed period, causes the cutting unit to cut the recording medium and then causes the printing unit to start new printing without causing the conveying unit to convey the recording medium in the reverse direction.

6. A printer comprising:

a receiving unit that receives from an external device, instruction information including at least a printing instruction or a cutting instruction concerning a long recording medium;

a conveying unit that conveys the recording medium in a forward direction from an upstream-side to a downstream-side and in a reverse direction from the downstream-side to the upstream-side along a conveyance path of the recording medium, based on instruction information received by the receiving unit;

a printing unit that based on instruction information concerning a printing instruction received by the receiving unit, prints onto the recording medium conveyed in the forward direction by the conveying unit, information that is based on the instruction information;

a cutting unit that cuts the recording medium at a prescribed position further downstream than a print position for printing by the printing unit, based on instruction information concerning a cutting instruction received by the receiving unit;

a control unit that controls the conveying unit, printing unit, and the cutting unit; and a time counting unit that counts time from a point of time at which the receiving unit receives instruction information concerning a cutting instruction to a point of time at which the receiving unit receives instruction information concerning a printing instruction subsequent to receipt of the instruction information concerning the cutting instruction, wherein the instruction information concerns at least any one among a first printing instruction for printing on the recording medium, print data received by the receiving unit, a second printing instruction for printing on the recording medium, print data preliminarily stored to the printer, and a cutting instruction concerning the recording medium, the time counting unit counts the time from the point of time at which the receiving unit receives instruction information concerning the cutting instruction to the point of time at which the receiving unit receives instruction information concerning the first printing instruction subsequent to the receipt of the instruction information concerning the cutting instruction, the control unit, if the time counted by the time counting unit is at least a prescribed period, causes the cutting unit to cut the recording medium, causes the conveying unit to convey the recording medium in a reverse direction by a prescribed distance, and then causes the printing unit to start new printing based on the instruction information concerning the first printing instruction, the control unit holds instruction information concerning the second printing instruction that is received during a period from the point of time at which the receiving unit receives the instruction information concerning the cutting instruction to the point of time at which the receiving unit receives the instruction information concerning the first printing instruction subsequent to the receipt of the instruction information concerning the cutting instruction, the control unit, if the time counted by the time counting unit is at least the prescribed period, causes the cutting unit to cut the recording medium, causes the conveying unit to convey the recording medium in the reverse direction by the prescribed distance, performs printing based on the held instruction information concerning the second printing instruction, and then causes the printing unit to start new printing based on the instruction information concerning the first printing instruction, the conveying unit conveys the recording medium in the reverse direction by a distance substantially equal to a distance between a print position of printing by the printing unit and a cutting position of cutting by the cutting unit in a conveyance direction of the recording medium, and the control unit, if the time counted by the time counting unit is less than the prescribed period, causes the cutting unit to cut the recording medium and then causes the printing unit to start new printing without causing the conveying unit to convey the recording medium in the reverse direction.

* * * * *